(12) United States Patent
Guasch Castelló et al.

(10) Patent No.: US 10,686,599 B2
(45) Date of Patent: Jun. 16, 2020

(54) METHOD FOR THE VERIFICATION OF THE CORRECT CONTENT OF AN ENCODED MESSAGE

(71) Applicant: SCYTL SECURE ELETRONIC VOTING, SA, Barcelona (ES)

(72) Inventors: Sandra Guasch Castelló, Terrassa (ES); Alex Escala Ribas, Barcelona (ES); Jordi Puiggalí Allepuz, Sant Cugat del Vallès (ES)

(73) Assignee: SCYTL SECURE ELECTRONIC VOTING, SA, Barcelona (ES)

( * ) Notice: Subject to any disclaimer, the term of this patent is extended or adjusted under 35 U.S.C. 154(b) by 217 days.

(21) Appl. No.: 15/538,033

(22) PCT Filed: Dec. 29, 2015

(86) PCT No.: PCT/IB2015/002422
§ 371 (c)(1),
(2) Date: Jun. 20, 2017

(87) PCT Pub. No.: WO2016/108080
PCT Pub. Date: Jul. 7, 2016

(65) Prior Publication Data
US 2017/0353310 A1    Dec. 7, 2017

(30) Foreign Application Priority Data

Dec. 31, 2014 (EP) .................. 14004456

(51) Int. Cl.
*H04L 29/06* (2006.01)
*H04L 9/32* (2006.01)
*H04L 9/08* (2006.01)

(52) U.S. Cl.
CPC ........... *H04L 9/32* (2013.01); *H04L 9/3218* (2013.01); *H04L 9/3226* (2013.01);
(Continued)

(58) Field of Classification Search
None
See application file for complete search history.

(56) References Cited

U.S. PATENT DOCUMENTS

2012/0144186 A1* 6/2012 Puiggali Allepuz ........................
H04L 9/3013
713/150

OTHER PUBLICATIONS

Cranor L. F. et al, "Sensus: A Security-Conscious Electronic Polling System for the Internet", System Sciences, 1997, Proceedings of the Thirtieth Hwaii International Conference on Wailea, HI, USA Jan. 7-10, 1997, Los Alamitos, CA, USA, IEEE Comput. Soc, US, vol. 3, Jan. 7, 1997, pp. 561-570 (Year: 1997).*

(Continued)

*Primary Examiner* — Andrew J Steinle
(74) *Attorney, Agent, or Firm* — Silvia Salvadori

(57) ABSTRACT

The method comprising: a) receiving, by an encoding module computer device (103), from a user (100), a message (101) including a content to be encoded; b) generating, by the encoding module (103), a generated encoding (104) of the content of the provided message (101) using encoding information (112); c) sending, by the encoding module computer device (103), the generated encoding (104) to a reception module computer device (106) and verifying, by the reception module computer device (106), that the generated encoding (104) corresponds to the encoding of the content of the message (101) by using a generated verification information (105) and public information (107), wherein the at least one code (102) having a cryptographic relationship with the public information (107) and the message (101), and the public information (107) and the message (101) having a cryptographic or a public relationship.

17 Claims, 6 Drawing Sheets

(52) U.S. Cl.
CPC .......... *H04L 9/3263* (2013.01); *H04L 63/123* (2013.01); *H04L 9/0861* (2013.01); *H04L 9/3247* (2013.01); *H04L 2209/08* (2013.01); *H04L 2209/34* (2013.01); *H04L 2209/463* (2013.01)

(56) References Cited

OTHER PUBLICATIONS

Adida B., "Helios: Web-based Open-Audit Voting", USENIX Associazion, Jul. 15, 2008, pp. 335-347 (Year: 2008).*
Chau M D. et al, "A Practical Voter-Verifiable Election Scheme", Jan. 1, 2005, Computer Security—Esorics 2005, Lecture Notes in Computer Science; LNCS, Springer, Berlin, DE, pp. 118-139 (Year: 2005).*

International Search Report and Written Opinion from parent application No. PCT/IB2015/002422 dated Feb. 15, 2016 and dated Feb. 23, 2016.
Cranor L. F. et al, "Sensus: A Security-Conscious Electronic Polling System for the Internet", System Sciences, 1997, Proceedings of the Thirtieth Hwaii International Conference on Wailea, HI, USA Jan. 7-10, 1997, Los Alamitos, CA, USA, IEEE Comput. Soc, US, vol. 3, Jan. 7, 1997, pp. 561-570.
Adida B., "Helios: Web-based Open-Audit Voting", USENIX Associazion, Jul. 15, 2008, pp. 335-347.
Chaum D. et al, "A Practical Voter-Verifiable Election Scheme", Jan. 1, 2005, Computer Security—Esorics 2005, Lecture Notes in Computer Science; LNCS, Springer, Berlin, DE, pp. 118-139.
European Search Report of priority EP application No. 14004456.1 dated Jun. 17, 2015.
Written Opinion of the uropean Search Report of priority EP application No. 14004456.1 dated Jun. 17, 201.

* cited by examiner

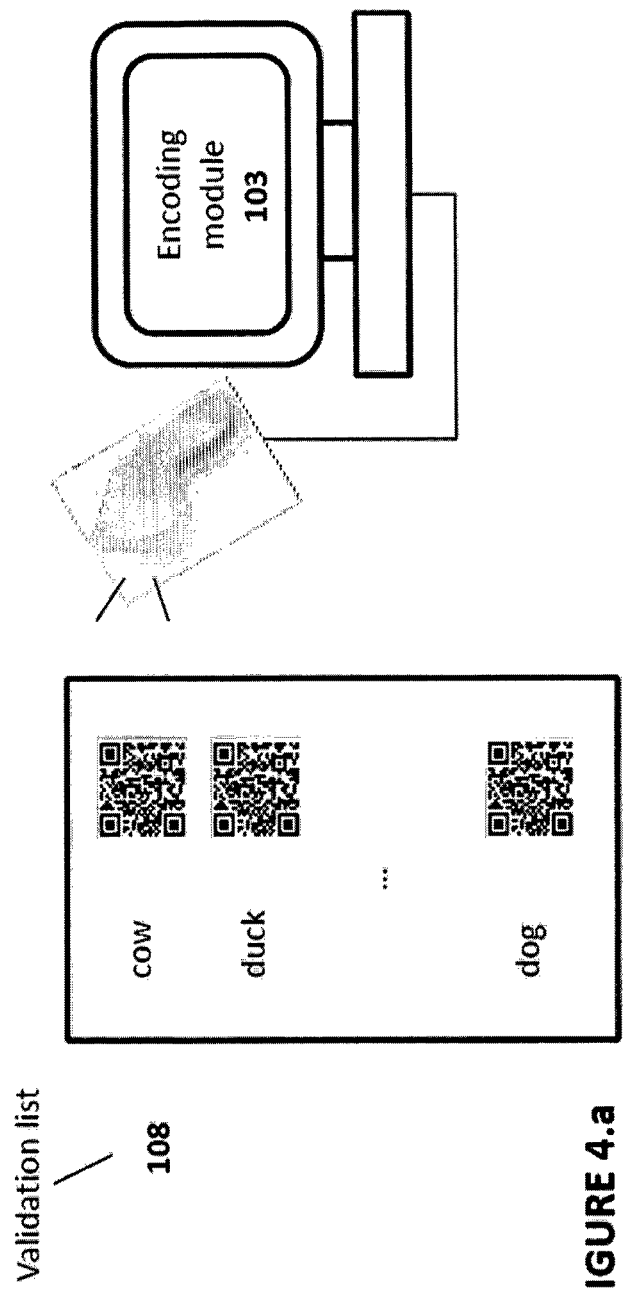
FIGURE 4.a
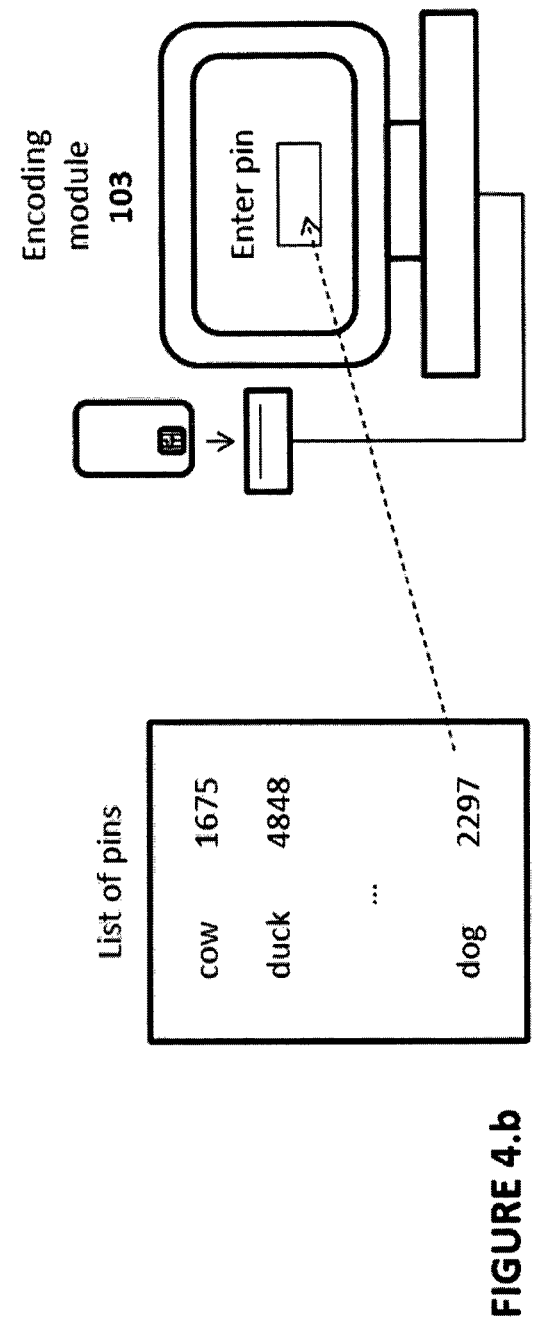
FIGURE 4.b

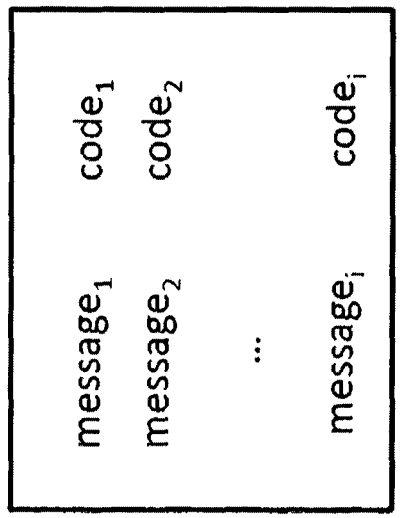
FIGURE 6.a
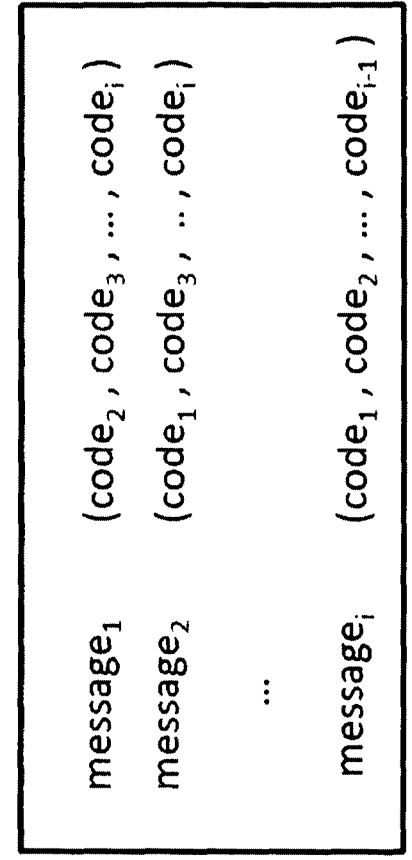
FIGURE 6.b

METHOD FOR THE VERIFICATION OF THE CORRECT CONTENT OF AN ENCODED MESSAGE

RELATED APPLICATIONS

This application is the US national phase application of international application number PCT/IB2015/002422, filed 29 Dec. 2015, which designates the US and claims priority to European application EP 14004456.1 filed 31 Dec. 2014, the contents of each of which are hereby incorporated by reference as if set forth in their entireties.

FIELD OF THE INVENTION

The present invention generally relates to encoding methods and verification mechanisms. In particular, the invention relates to a method for the verification of the correct content of an encoded message.

The invention can be used in any system that requires the proper encryption of messages. More specifically, it can be used in an electronic voting system to allow voters to verify if their encrypted cast votes really contain their voter intention (i.e., to allow cast-as-intended verification).

BACKGROUND OF THE INVENTION

In certain codification schemes, users are required to provide messages encoded in a specific way for further processing. Users, as humans, may not always be able to generate such encoding. Therefore, the use of an encoding device is required to generate it.

However, a corrupted encoding device can misbehave, so that an encoding of a message different than the one intended by the user is produced. Depending on the encoding, the user may not detect this misbehavior by inspecting the encoded message, even if (s)he inspects the encoded message using an alternative device.

This is for example the case occurring in some electronic voting schemes. The voter uses a voting device to navigate through the possible voting options, select some voting options and generate an encoding of such selected voting options. All these actions are performed prior to casting her/his vote. In this case, the voting device provides the functionality of an encoding device but also other features such as an interface for selecting the message to be encoded.

Generally, the encoding of the voting options is an encryption of them. A corrupted voting device could change the voting options to be encoded, and the voter, on view of the encoded options, might not be able to detect this modification. For example, when encryption schemes with randomization are used for such encoding, no information about which voting options have been encrypted is leaked from such encryption.

Cast-as-intended verification is a feature of some electronic voting schemes which allows the voter to detect such modification. Because only the voter knows which are the voting options that (s)he originally chose, this verification is generally intended to be performed only by her. In fact, this kind of mechanisms is known as individual verification mechanisms in the literature.

However, this means that the effort and responsibility of the verification process relies only on the voter, and this presents several drawbacks. For instance, in some cast-as-intended verification mechanisms the voter may require an audit device different from the voting device to verify the verification information. For instance, the Helios voting system, the Estonian voting system, the Wombat voting system or the Univote voting system. In addition, this audit device has to provide strong security features so that it cannot be corrupted, which is complex in practice. Moreover, this audit device might need to have some computational power. Assuming that all voters have access to such device is a strong assumption.

Cranor L. F. et. al. "Sensus: a security-concious electronic polling system for the Internet" discloses a practical, secure and private system for polling (conducting surveys and elections) over computer networks. Sensus uses blind signatures to ensure that only registered voters can vote and that each registered voter only votes once, while at the same time maintaining voters' privacy. In addition, Sensus allows voters to verify independently that their votes were counted correctly and to anonymously challenge the results should their votes be miscounted. Contrary to the present invention, in Sensus proposal the code is not associated with the message (selected by the voter/user). In addition, present invention to verify that a generated encoding corresponds to the encoding of the content of the message doesn't use the aforementioned message, that is, in present invention the verification is done without knowing which the original message was.

Ben Adida "Helios: Web-based Open-Audit Voting" discloses Helios, a web-based, open-audit voting system, in which anyone can create and run an election, and any willing observer can audit the entire process. Contrary to Helios, present invention does not perform any decryption on the encoded message.

Besides that, David Chaum et. al. "A Practical Voter-Verifiable Election Scheme" discloses a practical verifiable e-voting protocol in which voters are provided with means to verify that their vote has been included in the tally. The proposal of this document provides means for verification of the correct content of a cast vote (that is, that matches the voter's intention). Moreover, it does nor require the participation of the voter, since the verification can be done by any other third party without compromising the voter's privacy.

US-A1-2012144186 of the applicant of present invention describes a verification method which allows ensuring that the decryption process has been done honestly by the entity in charge of that. The method described in this invention is characterized by basing the verification of the correctness of the decryption of a set of encrypted messages in a proof demonstrating that the result of the operation with an operator [phi] of blocks of encrypted messages is equal to the encryption of the result of operating with the operator [Theta] blocks composed by the same messages, decrypted. In order to do that, a first input integrity proof is generated for each block of encrypted messages based on the operation [phi] of the encrypted messages, and the link with the output integrity proofs generated with the operation [Theta] of the decrypted messages composing each block is verified.

On the contrary of those known proposals, in present invention, a user chooses a message to encode, and then the encoding computer device creates an encoding, which allegedly is an encoding of the message chosen by the user and some verification information. The receiver of the encoded message—which is not necessarily the user who chose the message to encode—validates the verification information, in order to ensure that the generated encoding is in fact the encoding of the message chosen by the user.

Present invention can be applied in the field of electronic voting: an auditor validating the verification information can detect if a generated encoding produced by the voting device is in fact the encoding of the voting options chosen by the voter.

Present invention, therefore, provides a novelty in the fact that the cast-as-intended verification mechanism is not restricted to the voter anymore, since is the auditor, and with this it is meant any third party (or even the voter herself), who verifies the cast-as-intended property. Therefore, the cast-as-intended verification becomes universal, in the sense that it can be performed by anyone.

This provides the advantage of being able to perform a more systematic verification: all the cast votes can be verified, instead of trusting that the voter will verify her own vote.

Another advantage is that the kind of devices to perform the audit (audit devices) is not restricted to the devices a voter has access to. Therefore, specific audit devices with more computational capabilities and security features can be used.

Finally, the verification is not restricted to a sole entity (the voter) so in fact several parties may participate in the audit in order to provide more robustness to the process: in case one refuses to inform in case of some incident during the verification, other entities will do so.

SUMMARY OF THE INVENTION

Embodiments of the present invention address these and/or other needs by providing a method for the verification of the correct content of an encoded message. The method can be used in schemes of information encoding where it has to be guaranteed that the encoding process was correct without doing a decoding process. Moreover, the method can be applied in electronic voting schemes, to provide cast-as-intended verification to voters without compromising their privacy.

To that end, in the method initially an encoding module computer device receives from a user a message including content to be encoded, and then, the encoding module computer device generates a generated encoding of the content of the provided message using encoding information.

Once the generated encoding is generated, the encoding module computer device sends the generated encoding to a reception module computer device, the latter verifying, automatically or periodically every certain period of time, that the generated encoding corresponds to the encoding of the content of the message, i.e. that the content of the message has not been tampered, by using verification information and public information.

In addition, according to the invention, the public information may have a cryptographic relationship with the code and a public relationship with the message, or alternatively the code, the public information and the message may have a cryptographic relationship.

Moreover, the verification information is generated taking into consideration the generated encoding, the public information and at least one code associated with the message. The code may have been received by the encoding module computing device at the same time of the receiving of the message, or alternatively, after the generation of the generated encoding. To do that, different input interfaces can be used, for instance, a wireless connection, an USB connection, a Smartcard, a QR/barcode scanning, and/or a keyboard input, among others.

In accordance with an embodiment, the verification information is generated by the encoding module computer device upon the latter having received the at least one code from the user.

In accordance with another embodiment, the verification information is generated by a verification information generator module computer device to which the encoding module computer device is connected thereto (e.g. via a wireless communication), the verification information being generated upon the verification information generator module computer device having received, from the encoding module computer device, the generated encoding and an auxiliary information, and from the user the at least one code associated with the message.

According to the invention the public information is generated by a configuration module computer device, and can be also used for generating the generated encoding and/or the verification information.

In accordance with yet another embodiment, the verification information is generated by the verification information generator module computer device upon the latter having received, from an auxiliary information generator module computer device, the generated encoding and auxiliary information and, from the user, the at least one code.

The auxiliary information in this case is generated by said auxiliary information generator module computer device by using the generated encoding and/or the at least one code, and one or more cryptographic secret keys.

The encoding information, according to different embodiments, may be generated either by the encoding module computer device itself or by a remote device. According to said different embodiments, the encoding information preferably includes random or pseudo-random data.

According to an embodiment, the message and the code associated with the message are included in a validation list generated by the configuration module computer device, the module responsible too of the generation of said public information.

Preferably, the validation list is provided to the user by means of a paper support, a presentation on a display of a computing device, hardware token with storage capabilities including RFID, and/or a hardware token with storage and logic capabilities including a Smartcard. On another hand, the public information can be delivered to the different modules, i.e. the encoding module computer device, the verification information generator module computer device and the reception module computer device, as part of an initial configuration of the modules, from a central or distributed repository, or from an external source through a wireless connection, a USB connection, a Smartcard, a QR/barcode scanning or a keyboard input.

According to an embodiment, the code is generated by a code discloser module computer device by performing a cryptographic operation, including an encryption with deterministic properties with a private/secret cryptographic key, over the message received from the user, Alternatively, according to another embodiment, the code is generated by the code discloser module computer device upon the latter having received the code from the configuration module computer device in an encrypted form and having decrypted the code with a cryptographic key.

The cryptographic key can be internally generated by the code discloser module computer device or can be generated by the configuration module computer device that further transmits the generated cryptographic key to the code discloser module computer device.

According to an embodiment, the encoding module computer device apart from generating the generated encoding also generates a pre-verification information, using a secret key/secret information or a pair of public/private keys, and sends this generated pre-verification information to the verification information generator module computer device that uses it for generating the verification information.

According to the invention, the generated encoding comprises an encryption of a family of public key encryption algorithms, the encoding information comprises the randomness used in said encryption, and the verification information comprises a cryptographic proof of knowledge or a pair signature-certificate.

Moreover, the reception module computer device can be included in an audit module, being both modules in a same unit or in separated units.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

Figure 1:
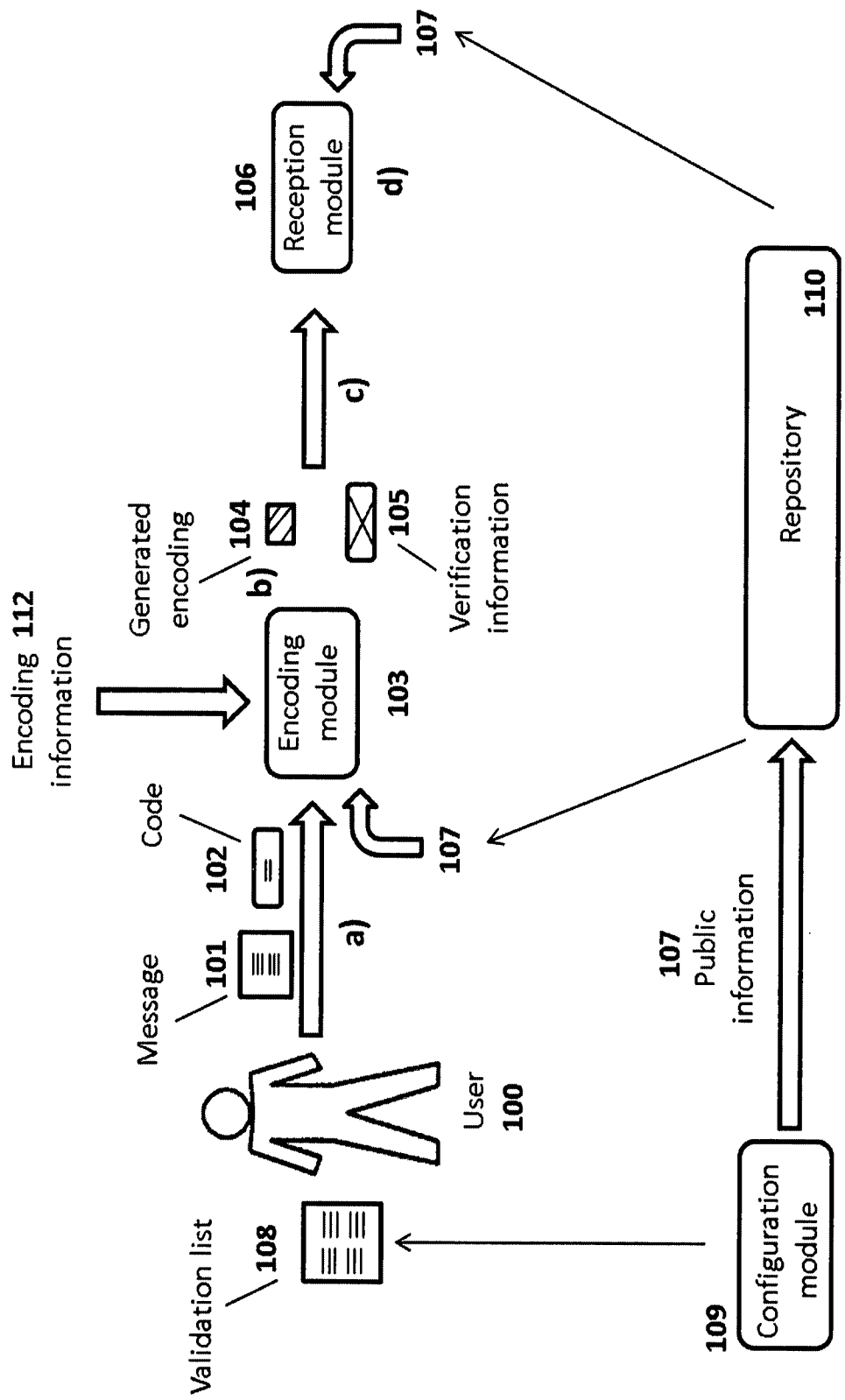
FIG. 1 is an illustration of the different modules and entities used by the present invention for verifying the correct content of an encoded message, according to an embodiment.

In the embodiment of the invention represented in FIG. 1, the user (100) provides to an encoding module computer device (103) a message (101) including content to be encoded and a code (102) associated with such message (101).

The message (101) and the code (102) are selected by the user (100) from a validation list (108), which has been generated in advance by a configuration module computer device (109), together with public information (107).

After receiving the message (101) and the code (102), the encoding module computer device (103) uses the public information (107) and the contents of the message (101) to generate a generated encoding (104), and a verification information (105) using also the code (102).

The generated encoding (104) and the verification information (105) are transmitted to a reception module computer device (106), which verifies the generated encoding (104) using the verification information (105) and the public information (107). This verification process provides assurance that the generated encoding (104) corresponds to the encoding of the content of the message (101) provided by the user (100).

Figure 2:
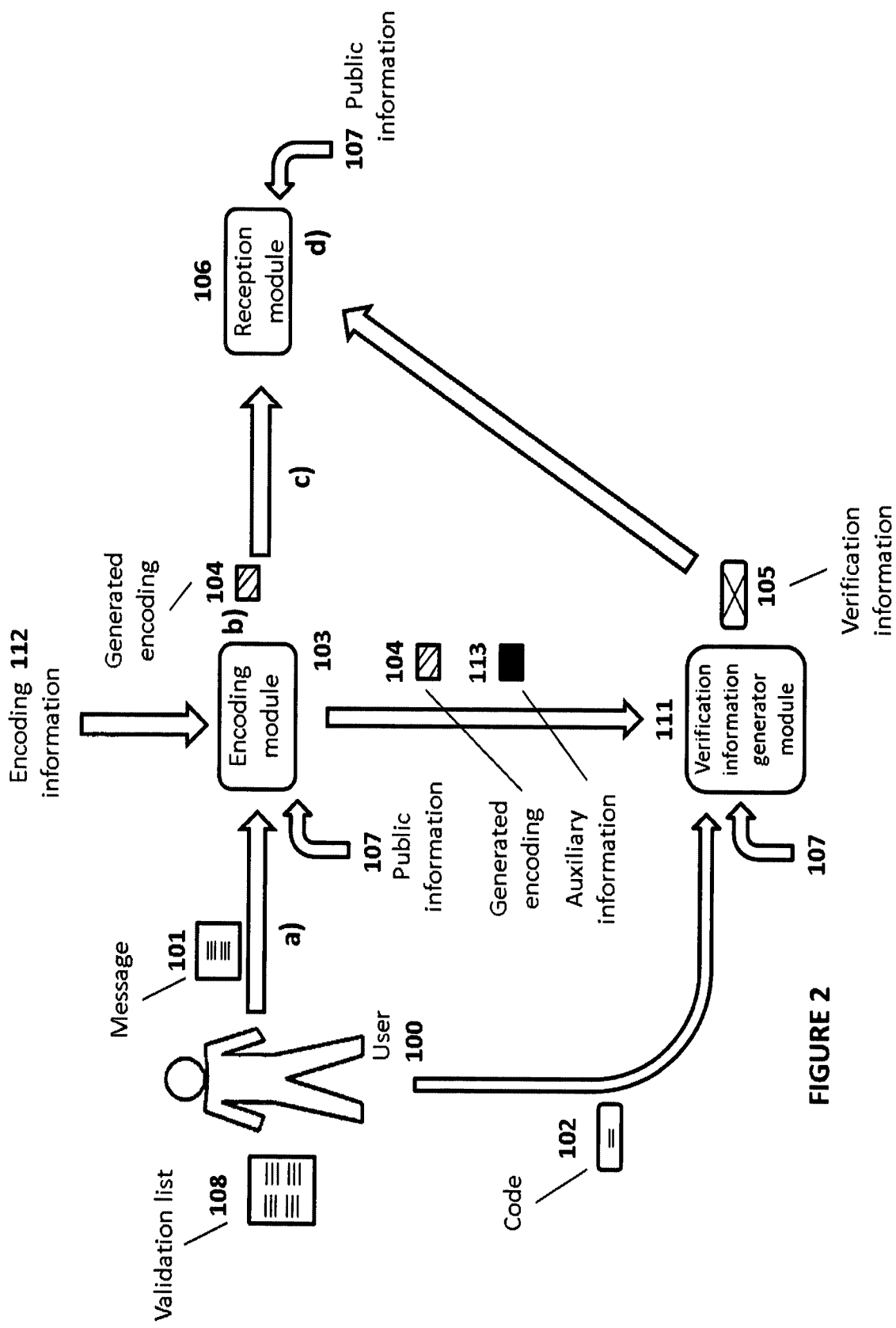

FIG. 2 is another illustration of the different modules and entities used by the present invention for verifying the correct content of an encoded message, according to another embodiment.

In the embodiments of the invention presented in FIG. 2, the user (100) provides a message (101) including content to be encoded to the encoding module computer device (103), and a code (102) associated with such message (101) to a verification information generator module computer device (111).

The message (101) and the code (102) are selected by the user (100) from the validation list (108), which has been generated by the configuration module computer device (109), together with public information (107).

Then, the encoding module computer device (103) generates the generated encoding (104) of the content of the provided message (101). Then, it passes the generated encoding (104) and auxiliary information (113) to the verification information generator module computer device (111), which generates the verification information (105). Both modules use public information (107) for performing these generations.

The generated encoding (104) and the verification information (105) are transmitted to the reception module computer device (106), which verifies the generated encoding (104) using the verification information (105) and the public information (107). This verification provides assurance that the generated encoding (104) corresponds to the encoding of the content of the message (101) provided by the user (100).

Figure 3:
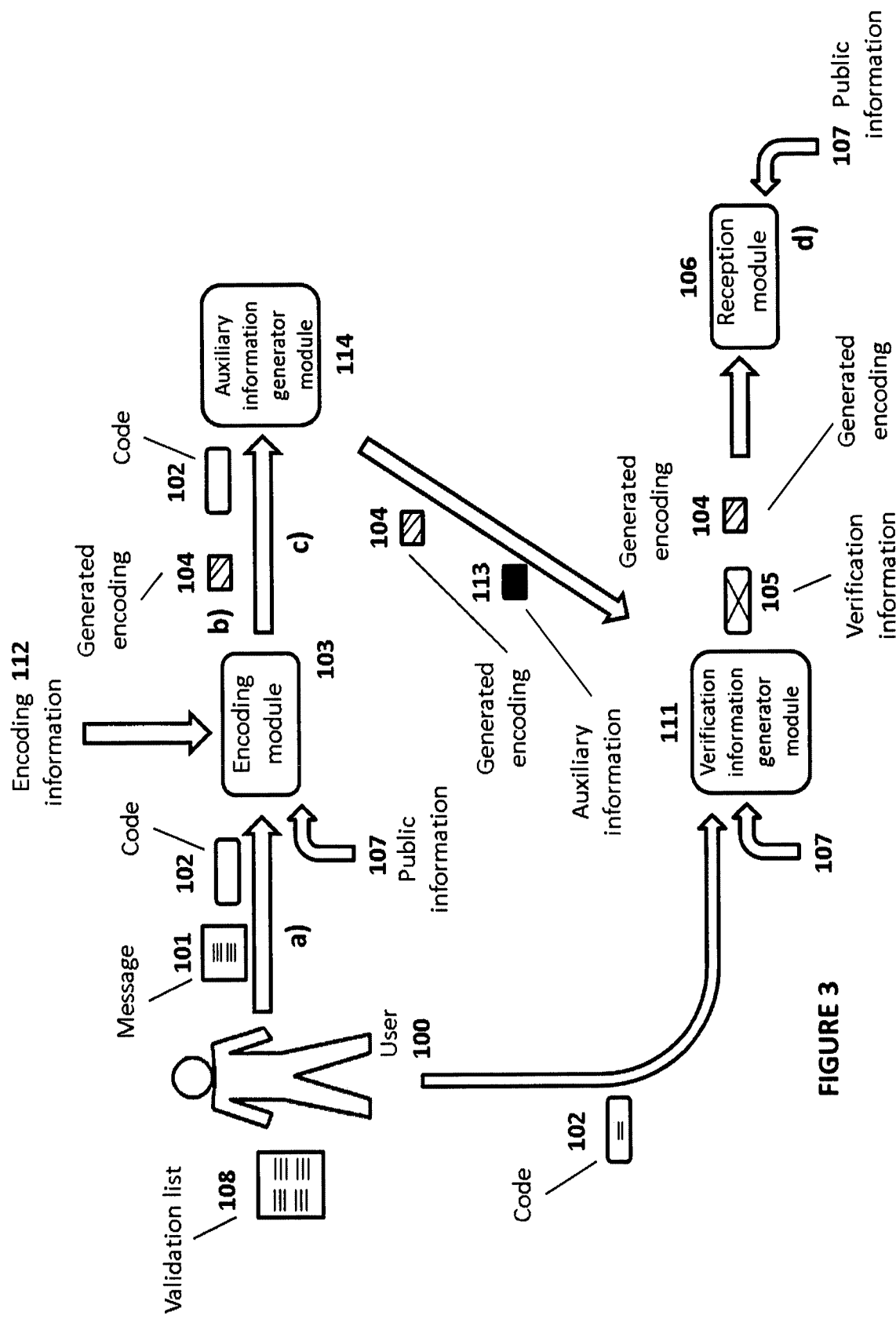

FIG. 3 shown an alternative embodiment of FIG. 2, where the auxiliary information (113) is generated by an auxiliary information generator module computer device (114), instead by the encoding module computer device (103), using as input the generated encoding (104) and/or the code (102).

FIG. 4 shows two possible implementations of the validation list (108).

FIG. 4.a shows an example of a validation list (108) in a paper support with QR codes. In this example, the user (100) scans the QR assigned to the message (101) the user (100) has provided to the encoding module computer device (103).

FIG. 4.b shows an example of deployment of the validation list (108) in a SmartCard and a paper sheet with pins corresponding to each message. In this case, the user (100) puts the SmartCard in a SmartCard reader and enters the pin corresponding to the message (101) to be encoded, in the encoding module computer device (103). The smartcard returns the codes (102) associated with the message (101).

Figure 5:
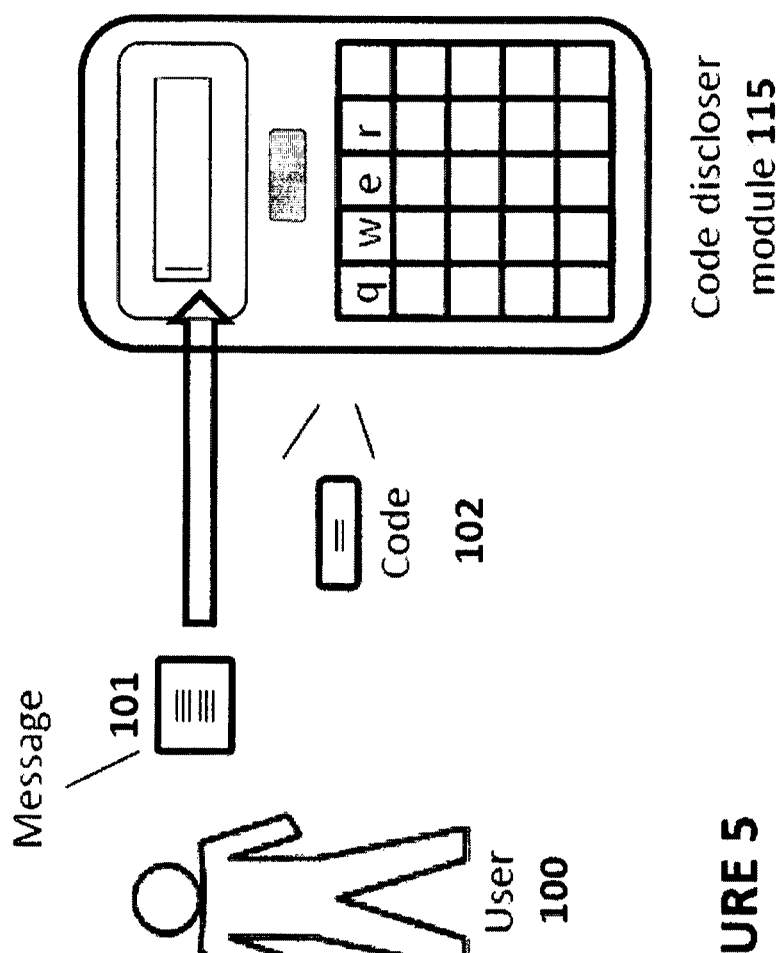

FIG. 5 shows an alternative embodiment where the user (100) uses a code discloser module computer device (115) to generate the code or codes (102) to be provided to the encoding module computer device (103). The code discloser module computer device (115) can be a hand held device owned by the user (100), such as a smartphone. In this embodiment, the user (100) enters the message (101) into the code discloser module computer device (115), for example with a keyboard, and the code discloser module computer device (115) then reveals the one or more codes (102), for example by audio or on the screen.

FIG. 6 shows two possible internal structures of the validation list (108).

FIG. 6.a shows an structure where each message is related to its own code. This is ideal for implementing AND Zero Knowledge Proofs.

FIG. 6.b shows an structure where each message is related to a list if codes belonging to the other options and excluding the code of the same message. This is ideal for implementing OR Zero Knowledge Proofs.

DETAILED DESCRIPTION OF THE INVENTION

1. The Main Components

The method of the invention described in the FIG. 1 is composed by the following steps:

Preliminary configuration step: in a preliminary step, a configuration module computer device (109) generates and provides a validation list (108) to a user (100) and public information (107) to an encoding module computer device (103) and to a reception module computer device (106).

Selection step a): in this step, the user (100) provides to the encoding module computer device (103) a message (101) including content to be encoded, and at least one code (102) associated with such message (101), which is selected from the validation list (108) generated in the preliminary step by the configuration module computer device (109).

Encoding step b): in this step, the encoding module computer device (103) generates a generated encoding (104) of the content of the provided message (101).

Sending step c): in this step, the encoding module computer device (103) sends the generated encoding (104) to a reception module computer device (106).

Verification step d): upon reception of the generated encoding (104) and of a verification information (105) generated, by the encoding module computer device (103) or by a verification information generator module computer device (111), by taking into consideration the generated encoding (104), the public information (107) and the at least one code (102), the reception module computer device (106) verifies the generated encoding (104) using the verification information (105) and the public information (107). This verification provides public assurance that the generated encoding (104) corresponds to the encoding of the content of the message (101) provided by the user (100).

The configuration module computer device (109) may comprise a PC or a server, depending a the computation demands of the managers of the service in which the invention is deployed. The validation list (108) generated by this configuration module computer device (109) is printed for delivering to users (100) (see FIG. 4.a), and the public information (107) is stored electronically in the configuration module computer device (109). Printed validation lists (108) can be delivered to voters/users (100) by postal or any other physical channel (e.g., in person in a registration center or polling station), while the public information (107) is delivered by electronic means (e.g., communication network or stored in an electronic media like a USB drive or DVD) to a repository computer device (110). This repository computer device (110) is a computer or server with storage means from which the public information (107) is made available at least to the other components of the invention: the encoding module computer device (103) and the reception module computer device (106). This public information (107) could be made available by network means (e.g., using Internet o local network) or transferred through a removable media (e.g., CD, DVD, USB memory, memory cards . . . ).

The encoding module computer device (103) is another computer that provides the user interface to the user (100) for providing the message (101) to encode and the code (102) associated with this message. The message (101) could be typed by the user (100) or the encoding module computer device (103) could provide a list of possible messages (101) that the user (100) could select. In this later case, the list of messages (101) could be obtained from the public information (107) made available by the repository computer device (110). User (100) uses the validation list (108) for providing the code (102) associated with the selected message (101). The encoding module computer device (103) computer can provide also input means to support different ways for introducing this code (102) to the voter, such as a keyboard (physical or logical such as a touch screen keyboard), a barcode reader or scanner (to read the code from a printed validation list) or a card reader (e.g., smartcard reader) in case the validation list is distributed in electronic storage devices such as smartcards. Encoding module computer device (103), uses the message (101) and encoding information (112) to compute the generated encoding (104) by performing a cryptographic operation. The encoding module computer device (103) also computes, according to an embodiment, the verification information (105) related to the generated encoding (104). The details of the cryptographic operations executed by the encoding module computer device (103) are explained later in this detailed description. The generated encoding (104) and the verification information (105) can be stored in the same encoding module computer device (103) and transmitted to the reception module computer device (106) using a network channel or removable physical media (e.g., memory cards, USB drives, CD/DVD, etc.).

The reception module computer device (106) is implemented as another computer that performs a set of cryptographic operations over the generated encoding (104) and the verification information (105) that allows verifying if the generated encoding really contains the message (101) selected by the user (100). These cryptographic operations are described later in detail, and require also access to the public information (107) made available by the repository module computer device (110). Depending on the result of these operations, the reception module computer device (106) will accept or reject the generated encoding (104). The accepted generated encoding is stored by the repository module computer device (110) in an electronic format (e.g., file or database). Alternatively, the rejected generated encoding can also be stored, by in a way that can be distinguishable from the valid one (e.g., in different files or database tables, or with an information data that says if it valid or no). The verification information (105) could be also stored by the reception module computer device (106) linked to its stored generated encoding (104).

In a preferred implementation scenario is based on using an online environment, such as Internet. In this case, the user (100) uses his/her own Internet connected device (computer or mobile phone) to perform the role and functions of the encoding module computer device (103). To this end, the user device executes a program that is previously installed in the device (e.g., an application obtained from a physical or online store like the APPLE™ or ANDROID™ Store). Another approach is that the application is embedded in a web page like a Java applet or Javascript code, so there is no need to install the encoding module computer device (103) application in advance. The configuration module computer device (109) is a computer that could be connected or not to Internet, but that has an interface that allows the administrators of the system to configure the service: specify the list of possible messages (101) and the list of users (100). With this information, the configuration module computer device (109) can generate the code(s) (102) for each possible message (101) for each user (100), and generate the validation list (108) of each user (100). The validation list (108) can be printed (FIG. 4.a) by this configuration module computer device (109), printed by an external printing module or can be stored in a smartcard (FIG. 4.b) with a different PIN for each option. In case of smartcard storage, PINs can be generated randomly or derived from the message using a master key. Individual PINs or master key used for generating the PIN must be provided to user (100) in a printed format, so they can be typed in or scanned by (e.g., barcode version) the user (100) with the encoding module computer device (103). In addition the validation list (108), the configuration module computer device (109) generates the public information (107), containing the public component of the codes (102) related to each validation list (108) and the list of valid messages (101). All, this information can be formatted in any available electronic format (e.g., binary files, XML files, etc.) to facilitate its storage and transfer to the repository module computer device (110). This transfer could be done by network means (e.g., electronic transfer protocols such as FTP or HTTP) or physical means (removable storage media such as USB drives or CD/DVD). When the transfer is done by a network connection, this could be done through a public way or private one (e.g., VPN).

The repository module computer device (110) is a server connected to Internet (e.g., web server) to make available the public information (107) to the encoding module computer device (103) and reception module computer device (106). This information can be accessed using any state of the art transfer protocols, such as FTP, HTTP, HTTPS, etc. Connection from the encoding (103) and reception (106) modules computer devices could be public or private (e.g., VPN).

In case of a web server implementation (HTTP/HTTPS), the public information (107) can be embedded in a web page accessed by the encoding module computer device (103). This web page could also contain the possible messages (101) that can be encoded by the user (100), so the selection of the message can be done by the user (100) with a click of mouse or finger touch (or audio orders in case of visual impaired users). The encoding module computer device (103) will have means to allow the user (100) to type the code (102), and/or read it from the validation list (108) by scanning means (barcode scanner or camera) or electronic means (smartcard reader).

The reception module computer device (106) can be another server implementing any state of the art Internet service protocol (e.g., web server or web application) for receiving from the encoding module computer device (103) the generated encoding (104) and verification information (105). After checking the validity of the generated encoding (104) it can respond to the encoding module computer device (103) using the same protocol, if this is accepted or not. Based on this response, the encoding module computer device (103) can show a response to the user (100) of the success or not of the encoding operation. This response can include a proof generated by the same reception module computer device (106) that was previously sent with the acceptance response to the encoding module computer device (103). That way, the user (100) can check if the response was generated by the reception module computer device (106).

In another implementation scenario, the encoding module computer device (103) is not connected by network means to the repository computer device (110) and reception module computer device (106). Therefore, transfer of information is done by physical means (removable media or printed formats).

Since the invention has been designed to be modular, it is easy to design other environments combining different ways where the components are connected through network channels or by physical transfer means using different state of the art data transfer technologies.

1.1. Preliminary Configuration Step: Generation of the Validation List (108) and the Public Information (107)

In a preliminary step, the configuration module computer device (109) generates a validation list (108) and public information (107). The validation list (108) will be provided to the user (100), while the public information (107) will be provided to the encoding module computer device (103) and to the reception module computer device (106). The validation list (108) contains a list of possible messages (101), each one correlated with one or more different codes (102) as shown in FIGS. 6.a and 6.b respectively. The public information (107) contains at least as many public lists (116) of information as validation lists (108). Each public list (116) is related to a validation list (108) and contains at least one public code (117) per valid messages (101).

The validation list (108) generated by the configuration module computer device (109) can be provided to the user (100) in several formats, which can involve a paper support (FIG. 4.a), a presentation in a display (for example, of the user's mobile phone, computer, etc.), in a hardware token with storage capabilities, such as an RFID, or in a hardware token with storage and logic capabilities such as a Smart-Card (FIG. 4.b).

The public information (107) generated by the configuration module computer device (109) can be provided to the encoding module computer device (103) and reception module computer device (106) in several formats, depending on the final implementation environments:

For example, this public information (107) can be provided to such modules as part of an initial configuration that is provided during the installation of the software application at each module.

Another alternative is that the encoding module computer device (103) and the reception module computer device (106) gather this information from the centralized or distributed repository computer device (110), where this data is stored, to which they access upon start of the applications they have installed, or when they need such public information (107) to perform their operations.

Yet another alternative is that such public information (107) is provided to the modules from an external source such as by a wired or wireless connection; a USB connection; using a SmartCard and a SmartCard reader interface; scanning a QR code or a Barcode, etc.

Another alternative is that a user of the module manually enters this public information (107).

The invention considers two different approaches for allowing the validation of the encoding of the information. One is based on using cryptographic zero knowledge proofs for generating the verification information (105) in the encoding module computer device (103). The second considers the use of Return Codes encoded in the public information (107) for the same purpose. Since both approaches requires different configuration steps, sections are identified for each to make easier the reference to the operation made in each embodiment when describing the steps of the invention.

1.1.1 Zero Knowledge Proofs

In a first preferred embodiment, the codes in the validation list (108) and the public information (107) have a cryptographic relationship, which consists in each code (102) being a private key from an asymmetric encryption scheme, and the public codes (117) of the public information (107) being formed by the public keys, each one corresponding to one of the mentioned private keys. In this embodiment, each one of the public keys is publicly related to one of the messages, from the list of messages to be used by the method, so that the entities and the modules which participate in this method have access to it. This relationship may be preserved by cryptographic means. For example, by means of a digital signature over each pair public key/message, or over the whole set of pairs. Any entity or module which participates in the method can verify such digitalsignature and verify that a public key is linked to a specific message.

An illustrative example of this embodiment is the following:

For each message m_i in the set of messages, a pair public/private of cryptographic keys PK_i/SK_i is generated by the configuration module computer device (109). The pair of public/private keys corresponds to an asymmetric encryption algorithm such as RSA, ElGamal, Paillier, EC-ElGamal.

The validation list (108) then contains at least the following tuples of data:

(m_1, SK_1)

(m_2, SK_2)

...

(m_k, SK_n), where n corresponds to the number of messages in the set.

The public information (107) then contains at least the following tuples of data:

(m_1, PK_1)

(m_2, PK_2)

...

(m_k, PK_n), where n corresponds to the number of messages in the set.

The public information (107) could also contain the public parameters of the encryption scheme to which these keypairs PK_i, SK_i correspond, for example the RSA/ElGamal/Paillier modulo, or the elliptic curve parameters for EC-ElGamal.

Each pair m_i-PK_i, or the whole set of pairs, can be digitally signed using a private key known by the configuration module (109), for which the corresponding public key or digital certificate is known by the modules participating in the method.

In this preferred embodiment, a different validation list (108) and public information (107) will be generated for each of the users which are intended to use the method described in this invention.

The proposed invention can also be used with schemes in which the codes (102) and public codes (117) could be composed by more than one component. In this case, for each message, the validation list (108) will have a format like this:

(m_1, (SK_1.1, ... , SK_1.$i$))

...

(m_k, (SK_n.1, ... , SK_n.$i$))

Or the public information (107):

(m_1, (PK_1.1, ... , PK_1.$i$))

...

(m_k, (PK_n.1, ... , PK_n.$i$))

1.1.2 Return Codes

In a second preferred embodiment, the messages and codes in the validation list (108) and the public information (107) have another cryptographic relationship. This cryptographic relationship consists on the following: the public information (107) contains pairs of reference-value, at least one per each message in the validation list (108), where 'value' is an encryption of a digitally signed piece of information. The decryption key to recover such digitally signed piece of information is constructed with a cryptographic operation involving the message 'm_i' and the code corresponding to such message in the validation list (108). This cryptographic operation uses secret keys and cryptographic algorithms such as one-way keyed functions and symmetric encryption algorithms.

An example is the following:

In the configuration module (109), for each message 'm_i' in the validation list (108):

1. A code C_i is generated, at random or using a pseudo-random number generator.
2. A transformation LTR_i is computed from the message 'm_i' and the code C_i, using a keyed one-way function such as an exponentiation in a finite field using a secret key 'ske', or symmetric cryptographic algorithms (such as message authentication code generation like a HMAC, or symmetric encryption schemes like AES) using a symmetric secret key 'ske'. The message m_i and the random value C_i can be concatenated, xor-ed or operated together in another way in order to be used as the input of the keyed one-way function.
3. A value T_i is generated, using a random or pseudo-random number generator. This value is digitally signed using a private key 'sks' (which is the private part of a cryptographic key pair composed by this private key 'sks' and a public key 'pks') and a cryptographic signing algorithm known in the state of the art, such as RSA.
4. The value T_i and its signature are encrypted using a symmetric encryption algorithm, such as AES, and the transformation LTR_i is used as the symmetric secret key. The result is denoted as E((T_i, sig(T_i)), LTR_i).

The information generated above is structured as follows:

The validation list (108) contains the list of messages 'm_i', each one associated to its corresponding code 'C_i'.

(m_1, C_1)

(m_2, C_2)

...

(m_n, C_n)

The public information (107) contains a mapping table/file where at least one pair reference-value is stored for each message 'm_i' appearing in the validation list (108). The reference H(LTR_i) is a one-way function such as a cryptographic hash function H (for example, of the family of SHA-1, SHA-2, SHA-3) computed over the result of the transformation LTR_i, and the value is E((T_i, sig(T_i)), LTR_i), which is the result of the encryption of T_i and its signature, using the result of the transformation, LTR_i, as key.

(LTR_i, E((T_1, sig(T_1)), LTR_1))

(H(LTR_2), E((T_2, sig(T_2)), LTR_2))

...

(H(LTR_n), E((T_n, sig(T_n)), LTR_n))

The public information (107) also contains the public key 'pks', which is the public part of the cryptographic key pair 'pks', 'sks', for which 'sks' has been used to sign each of the values T_i.

In a preferred embodiment, at least the secret key 'ske', is different for each user intended to use the mechanism. In another preferred embodiment, the set of codes 'C_i' is different for each user intended to use the mechanism. Therefore, in both cases a different validation list (108) and public information (107) will be generated for each of the users which are intended to use the method described in this invention.

In an alternative embodiment, 'ske', 'pks', 'sks', the set of codes 'C_i' and therefore the validation list (108) and the public information (107) are the same for all users.

In this embodiment, at least part of the cryptographic private/secret keys used to establish such relationship are provided to the encoding module computer device (103) (for the example, the key 'ske' used when generating such validation list (108) and public information (107) explained above). Distribution methods such as the ones described for the distribution of the public information (107) can be used for distributing such cryptographic keys. These 'ske' keys can be generated at random by the configuration module or provided by a trusted third party.

1.2. Provisioning Step a): Provision of a Message (101) and One or More Codes (102) to the Encoding Module Computer Device (103)

In provisioning step a) the user (100) provides to the encoding module computer device (103) a message (101) and one or more codes (102) from the validation list (108) associated with such message (101). The user (100) may use different input interfaces of the encoding module computer device (103) to provide the message (101) and the one or more codes (102). For instance by a wired or wireless connection (for example the user (100) has a storage/computing device with such kind of output interface, which contains the message (101) and the code(s) (102) to provide); a USB connection (for example the user (100) connects a storage/computing device with such kind of output interface to the encoding module computer device (103)); inserting a SmartCard in a SmartCard reader in the encoding module computer device (103); scanning a QR code/Barcode using a QR/Barcode scanner from the encoding module computer device (103); or using a keyboard or microphone input interface.

In a preferred embodiment where the user (100) provides more than one code and has received the validation list (108) stored in a SmartCard, the SmartCard can be programmed so different memory regions per message (101) are set up for storing the different subsets of codes (102) related to the message, and a different PIN is used to access to each memory region.

For example, in a preferred embodiment the codes assigned to all the messages in the validation list (108), but the one assigned to the provided message (101), have to be provided to the encoding module computer device (103). In this scenario, the SmartCard can have one memory region for each one of the messages in the validation list (108), which contains all the codes but the one assigned to such specific message. Then the user (100) can insert the SmartCard into a SmartCard reader of the encoding module computer device (103) and enter the PIN associated to the provided message (101), so that the corresponding codes (102) are released to the encoding module computer device (103).

In an alternative embodiment where the user (100) provides more than one code and has received the validation list (108) in a paper support containing QR codes, several QR codes can be used to represent the values of the different subsets of codes from the validation list (108).

For example, in a preferred embodiment the codes assigned to all the messages in the validation list (108), but the one assigned to the provided message (101), have to be provided to the encoding module computer device (103). In this scenario, the paper support can have one QR code for each one of the messages in the validation list (108), which contains all the codes but the one assigned to such specific message. Then the user (100) can use a QR reader from the encoding module computer device (103) to scan the QR code corresponding to the provided message (101), so that the corresponding codes (102) are released to the encoding module computer device (103).

In the preferred embodiment described in the FIG. 1 the user (100) provides the message (101) and one or more codes (102) to the encoding module computer device (103) at the same time in step a). However, in an alternative embodiment the user (100) may provide the message (101) in step a) and the one or more codes (102) after step b).

1.3. Encoding Step b): Generation of a Generated Encoding (104)

In encoding step b) the encoding module computer device (103) generates the generated encoding (104) of the content of the provided message (101). In a preferred embodiment the generated encoding (104) consists on the encryption of the whole or at least part of the message (101) using an asymmetric encryption algorithm such as RSA, ElGamal, Paillier or EC-ElGamal. The encryption is then performed with a public key corresponding to such algorithm.

In a preferred embodiment such public key and the corresponding encryption parameters are generated by the configuration module computer device (109), and provided to the encoding module computer device (103) as part of the public information (107).

In an alternative embodiment this public key and the corresponding encryption parameters are not part of the public information (107) generated by the configuration module computer device (109) but generated by another entity, for example the intended receiver of the generated encoding (104). In such case, such public key and encryption parameters may be provided to the encoding module computer device (103) by any of the means described for the provision of the public information (107). Alternatively, this public key could be provided by this entity to the configuration module computer device (109) to add it in the public information (107).

The encoding module computer device (103) uses encoding information (112) in order to generate the generated encoding (104).

In a preferred embodiment where such generated encoding (104) is the encryption of the whole or at least part of the message (101), the encoding information (112) is the randomness, or at least part of it, used to perform the encryption according to the asymmetric encryption algorithm used. Thus, this encoding information (112) comprises random or pseudo-random data.

In a preferred embodiment such encoding information (112) is generated by the encoding module computer device (103), using some information from its internal state, and/or from events received through its input interfaces.

In an alternative embodiment, such encoding information (112) is generated by a device remote to the encoding module computer device (103), such as specific-purpose hardware (e.g., smartcard, cryptographic token or hardware security module).

In a preferred embodiment, the encoding module computer device (103) generates new encoding information (112) each time the message (101) is encoded.

1.3.1 Sending Step c): Sending of the Generated Encoding (104) to the Reception Module Computer Device (106)

1.4. Proving: Generation of a Verification Information (105)

In proving step, the encoding module computer device (103) may use the generated encoding (104), the encoding information (112), the one or more codes (102) provided by the user (100) and the public information (107) to generate the verification information (105).

In a first preferred embodiment, the encoding module computer device (103) generates the verification information (105) using a OR zero-knowledge proof of knowledge (OR-ZKP) well known in the state of the art of cryptography. In a second preferred embodiment, the encoding module computer device (103) generates the verification information (105) using a AND zero-knowledge proof of knowledge (AND-ZKP) well known in the state of the art of cryptography.

Both embodiments are described in detail in the following sections.

1.4.1 Generation of the Verification Information (105) with OR-ZKP

In the first preferred embodiment, the generated encoding (104) is the encryption of the message (101) provided by the user (100); the encoding information (112) is the randomness used for the encryption; the codes in the validation list (108) are private keys linked to messages; and their corresponding public keys, also linked to messages, are part of the public information (107). Then:

1. The user (100) provides a set of codes (102) in the validation list (108) associated to all the messages but the one related to the message (101) encoded.
2. The encoding module computer device (103) generates the verification information (105) using a OR zero-knowledge proof of knowledge well known in the state of the art of cryptography. This verification information (105) proofs for each possible message that the generated encoding (104) is the encryption of this message (101) or that the encoding module computer device (103) received the secret key code (102) related to this message (101).

In a more formal description, this OR zero-knowledge proof of knowledge is based on the following statement:

For each message 'm_i' in the validation list (108) and in the public information (107):

"The generated encoding (104) is the encryption of the message m_i" OR "I know the code 'SK_i' associated to such message 'm_i' in the validation list (108)".

This statement has to be fulfilled by all the messages 'm_i'.

A more accurate description of this proof using cryptographic terms commonly used in cryptography is the following one:

Let the relation Renc=((C,m_i); r) be a tuple of ciphertext 'C', message 'm_i' and encryption randomness 'r' such that 'C' is an encryption of the message 'm_i' under the encryption scheme public key, using the encryption randomness 'r'.

Let the relation Row=(y;x) be pairs of values which have a cryptographic relation, as being 'y' a public key of an encryption scheme, and 'x' the corresponding private key.

Then the relation for which the zero-knowledge proof of knowledge is generated is the following:

$$R2cnf\_OR = \{((C, (m\_1, \ldots m\_n),$$
$$(y\_1, \ldots, y\_n));$$
$$(r, (x\_1, \ldots x\_n)) \text{ such that}$$
$$(((C, m\_1); r) \text{ belongs to } Renc \text{ OR}$$
$$(y\_1; x\_1) \text{ belongs to Row}) \text{ AND}$$
$$(((C, m\_2); r) \text{ belongs to } Renc \text{ OR}$$
$$(y\_2; x\_2) \text{ belongs to Row}) \text{ AND}$$
$$\ldots$$
$$(((C, m\_n); r) \text{ belongs to } Renc \text{ OR}$$
$$(y\_n; x\_n) \text{ belongs to Row})\},$$

where,

C=generated encoding (104), which in this preferred embodiment is the encryption of the message m_i.

(m_1, . . . , m_n)=the list of messages contained in both the validation list (108) and the public information (107).

(y_1, . . . , y_n)=(PK_1, . . . , PK_n) which are the public keys associated to the messages, contained in the public information (107).

r=the encoding information (112) which in this preferred embodiment is the randomness used for the encryption of the message m_i.

(x_1, . . . , x_n)=(SK_1, . . . , SK_(i−1), rand, SK_(i+1), . . . , SK_n), where 'rand' is a random number according to the parameters of the encryption scheme defined for the key pairs PK_i-SK_i, and SK_j is the code (which in this preferred embodiment is a private key) associated to the message m_j. Note that the codes associated to all the messages are provided for generating the proof, but the one corresponding to the provided message (101), m_i.

The inputs (C, (m_1, . . . m_n), (y_1, . . . , y_n)) are public to both the entity which generates the proof (in this preferred embodiment, the encoding module computer device (103)), and the entity which verifies the proof (in this preferred embodiment, the reception module computer device (106)).

The inputs (r, (x_1, . . . x_n)) are private and only known by the entity which generates the proof (in this preferred embodiment, the encoding module computer device (103)). In cryptography terminology, they are the witness of the zero-knowledge proof of knowledge.

1.4.2 Generation of the Verification Information (105) with AND-ZKP

In a second preferred embodiment, the generated encoding (104) is the encryption of the message (101) provided by the user (100); the encoding information (112) is the randomness used for the encryption; the codes in the validation list (108) are private keys linked to messages; and their corresponding public keys, also linked to messages, are part of the public information (107). In this case:

1. The user (100) provides the code (102) in the validation list (108) associated to the message (101) encoded.
2. The encoding module computer device (103) generates the verification information (105) using an AND zero-knowledge proof of knowledge (AND-ZKP) well known in the state of the art of cryptography. This verification information (105) proofs that the generated encoding (104) is the encryption of the message (101) related to the code (102) given by the user (100) to the encoding module computer device (103).

In a more formal description, this AND zero-knowledge proof of knowledge is based on the following statement:

For each message 'm_i' in both the validation list (108) and in the public information (107):

"The generated encoding (104) is the encryption of the message m_i" AND "I know the code 'SK_i' associated to such message 'm_i' in the validation list (108)".

This statement has to be fulfilled for only one of the messages 'm_i', specifically the one for which the generated encoding (104) has been generated, which is the provided message (101).

A more accurate description of this proof using cryptographic terms commonly used in cryptography is the following one Let the relation Renc=((C,m_i); r) be a tuple of ciphertext 'C', message 'm_i' and encryption randomness 'r' such that 'C' is an encryption of the message 'm_i' under the encryption scheme public key, using the encryption randomness 'r'.

Let the relation Row=(y;x) be pairs of values which have a cryptographic relation, as being 'y' a public key of an encryption scheme, and 'x' the corresponding private key.

Then the relation for which the zero-knowledge proof of knowledge is generated is the following:

$$R2cnf\_AND = \{((C, (m\_1, \ldots m\_n),$$

$$(y\_1, \ldots, y\_n));$$

$$(r, (x\_1, \ldots x\_n)) \text{ such that}$$

$$(((C, m\_1); r) \text{ belongs to } Renc \text{ AND}$$

$$(y\_1; x\_1) \text{ belongs to Row) OR}$$

$$(((C, m\_2); r) \text{ belongs to } Renc \text{ AND}$$

$$(y\_2; x\_2) \text{ belongs to Row) OR}$$

$$\ldots$$

$$(((C, m\_n); r) \text{ belongs to } Renc \text{ AND}$$

$$(y\_n; x\_n) \text{ belongs to Row)}\},$$

where,

C=generated encoding (104), which in this preferred embodiment is the encryption of the message m_i.

(m_1, ..., m_n)=the list of messages contained both in the validation list (108) and in the public information (107).

(y_1, ..., y_n)=(PK_1, ..., PK_n) which are the public keys associated to the messages, contained in the public information (107).

r=the encoding information (112) which in this preferred embodiment is the randomness used for the encryption of the message m_i.

(x_1, ..., x_n)=(rand_1, ..., rand_(i−1), SK_i, rand_(i+1), ..., rand_n), where 'rand_j' is a random number according to the parameters of the encryption scheme defined for the key pairs PK_j-SK_j, and SK_i is the code (which in this preferred embodiment is a private key) associated to the message provided to be encoded, m_i (101). Note that only the code associated to the provided message (101) m_i is provided for generating the proof.

The inputs (C, (m_1, ... m_n), (y_1, ..., y_n)) are public to both the entity which generates the proof (in this preferred embodiment, the encoding module computer device (103)), and the entity which verifies the proof (in this preferred embodiment, the reception module computer device (106)).

The inputs (r, (x_1, ... x_n)) are private and only known by the entity which generates the proof (in this preferred embodiment, the encoding module computer device (103)). In cryptography terminology, they are the witness of the zero-knowledge proof of knowledge.

1.4.3 Generation of the Verification Information (105) Using Return Codes

In a third preferred embodiment, the generated encoding (104) is the encryption of the message (101) provided by the user (100); the encoding information (112) is the randomness used for the encryption; and the messages and codes in the validation list (108) and the public information (107) have a cryptographic relationship. Then:

1. The user (100) provides the code (102) in the validation list (108) associated to the message (101) encoded.
2. The encoding module computer device (103) generates the verification information (105) by decoding from the public information (107) a signed value T_i digitally signed with a private key 'sks'. Optionally the encoding module computer device (103) verifies the validity of T_i by checking its digital signature using the public key 'pks' contained in the public information (107).

In this preferred embodiment, the verification information (105) is computed by the encoding module computer device (103) in the following way using as input the message m_i (101) and the code C_i (102) provided by the user (100), the public information (107) and the secret key 'ske' provisioned to the encoding module computer device (103):

1. The encoding module computer device (103) computes the transformation LTR_i using as input the message 'm_i', the code C_i and the secret key 'ske' in the same way that has been described in the section Return Codes of preliminary step.
2. The encoding module computer device (103) computes a one-way function such as a cryptographic hash function H (for example, of the family of SHA-1, SHA-2, SHA-3) over the result of the transformation (LTR_i) in the same way that has been described in the section Return Codes of preliminary step for the generation of the public information (107).
3. The encoding module computer device (103) uses the result of the computation from step 2 H(LTR_i) as reference to retrieve the corresponding value E((T_i, sig(T_i)), LTR_i) from the public information (107).
4. The encoding module computer device (103) decrypts the signed value T_i, and its signature sig(T_i), using a symmetric encryption algorithm, such as AES, and the result of the transformation (LTR_i) as the secret key for such decryption (in the same way that has been described in the section Return Codes of preliminary step). The result of this decryption is the verification information (105).

1.5 Validation Step d): Verification of the Correctness of the Generated Encoding (104)

In step d) the reception module computer device (106) receives the generated encoding (104) and the verification information (105). They may be received directly from the encoding module computer device (103), or they may be transmitted through one or several intermediate modules.

Intermediate modules may be in charge of routing or storing the generated encoding (104) and the verification information (105) in intermediate stages until they are delivered to the reception module computer device (106).

In a preferred embodiment, upon reception of the generated encoding (104) and of the verification information (105), the reception module computer device (106) uses the verification information (105) and the public information (107) in order to verify that the generated encoding (104) corresponds to the encoding of the content of the message (101) provided by the user (100).

In an alternative embodiment the reception module computer device does not perform such verification process upon reception of the generated encoding (104) and the verification information (105), but periodically. In such embodiment, the reception module computer device (106) stores the information containing at least the pairs of (generated encoding (104), verification information (105)) it receives in a certain period of time, and then performs the verification of each pair.

The reception module computer device (106) may perform several actions depending on the result of the validation of the verification information (105).

For example, the reception module computer device (106) may notify the result of the validation through an output interface (network, screen, audio, etc.), so the manager of such module gets notified.

Another option is that the reception module computer device (106) sends back to the encoding module computer device (103) the result of the validation. This response may be transmitted back to the encoding module computer device (103) by the same channel used to transmit the generated encoding (104) and the verification information (105) to the reception module computer device (106), or by an alternative one.

Another option is that the reception module computer device (106) sends back the result of the validation directly to the user (100). For this purpose, the reception module computer device (106) will then have some information about the user (100) for which the generated encoding (104) and the verification information (105) have been submitted. Such result of the verification may be transmitted by one or several channels, including mail or SMS.

Alternatively, the reception module computer device (106) can publish the result of the validation with a reference of the generated encoding (104). This reference could be the same generated encoding (104) or a fingerprint of this (for instance after applying a hash function like SHA1 or SHA2 to the generated encoding (104)). That way anybody knowing the generated encoding (104) value can check if this was validated or not by the reception module computer device (106). The publication of this information can be done by sending it to the repository module computer device (110) or any other module public available. Information can be signed by a symmetric secret key owned by the reception module computer device (106) to allow anybody to check the authenticity and integrity of the published information.

Besides notifying the result of the verification, the reception module computer device (106) may attach the result of the verification to the received information (comprising at least the generated encoding (104) and the verification information (105)), so that it is included in the further processing of the received information, such as being stored, or being retransmitted to another module.

Finally, the reception module computer device (106) may also vary the processing of the received information (comprising at least the generated encoding (104) and the verification information (105)) according to the result of the verification. For example, it may store the generated encoding (104) and the verification information (105) only if the verification is successful, and may retransmit them to another module otherwise.

The steps performed by the reception module computer device (106) to validate the generated encoding (104) using the verification information (105), will depend on the mechanisms used for generating this verification information (105): Zero Knowledge Proofs or Return Codes.

1.5.1 Verification Using Zero Knowledge Proofs

In a first preferred embodiment where: the generated encoding (104) is the encryption of the message (101) provided by the user (100); the encoding information (112) is the randomness used for the encryption; the public information (107) contains public keys linked to messages; and the verification information (105) is a zero-knowledge proof of knowledge, well known in the state of the art of cryptography, for either the previously described relation R2cnf_OR or R2cnf_AND. These relations are described in the subsections explaining the generation of the verification information (105) with OR-ZKP or AND-ZKP respectively, located in the proving section.

The reception module computer device (106) proceeds to verify the generated encoding (104) by instantiating a verification of the zero-knowledge proof of knowledge of the corresponding kind (for either the relation R2cnf_OR or the relation R2cnf_AND) with inputs:

The generated encoding (104), which in this preferred embodiment is the encryption of the provided message (101).

The list (m_1, . . . , m_n) of messages (101) contained in the public information (107).

The public keys (PK_1, . . . , PK_n), which are the public keys associated to the messages (101), contained in the public information (107).

The verification information (105), which in this preferred embodiment is a zero-knowledge proof of knowledge of the previous said statement (for either the relation R2cnf_OR or the relation R2cnf_AND).

1.5.2 Verification Using Return Codes

In a second preferred embodiment where: the generated encoding (104) is the encryption of the message (101) provided by the user (100); the encoding information (112) is the randomness used for the encryption; the messages and codes in the validation list (108) and the public information (107) have a cryptographic relationship; and the verification information (105); and the verification information (105) is a signed value T_i, digitally signed with a private key 'sks', the public key 'pks' of which is contained in the public information (107), The reception module computer device (106) proceeds to the verification of the generated encoding (104) by verifying the digital signature sig(T_i) of the value T_i, which are contained in the verification information (105), using the public key 'pks' corresponding to the private key 'sks' used by the configuration module computer device (109) to generate such signature, and a cryptographic signature verification algorithm, such as RSA (which matches the one used by the configuration module computer device (109) for signing).

In a preferred embodiment such public key 'pks' is part of the public information (107). In an alternative embodiment such public key 'pks' has been received by the reception module computer device (106) outside the public information (107).

2. Adding a Verification Information Generator Module Computer Device (111)

In an alternative implementation of the invention, an additional verification information generator module computer device (111) is added for generating the verification information (105) independently of the encoding module computer device (103). This approach provides separation of duties to the invention, since the encoding operation and the proof generation operation are carried out by different entities.

The additional verification information generator module computer device (111) to the main proposal (described in the FIG. 2) does not add additional steps in the main invention. However, implies the following changes in the processes implemented in these steps:

Preliminary configuration step: in the preliminary configuration step, the validation list (108) and the public information (107) generated by the configuration module computer device (109) are also provided to the verification information generator module computer device (111).

Provisioning step a): in this step, the user (100) does not provide the code (102) to the encoding module computer device (103), but to the verification information generator module computer device (111).

Encoding step b): in this step, the encoding module computer device (103) passes the generated encoding (104) and auxiliary information (113) to the verification information generator module computer device (111). The encoding module computer device (103) still passes the generated encoding (104) to the reception module computer device (106), but the verification information (105) is missing.

Proving step: in this step, the verification information generator module computer device (111) uses the code (102) provided by the user (100), the generated encoding (104) and the auxiliary information (113) to generate the verification information (105). The encoding module computer device (103) is no longer required in this step.

Validation step d): upon reception by the reception module computer device (106) of the generated encoding (104) from the encoding module computer device (103) and the verification information (105) from the verification information generator module computer device (111), the reception module computer device (106) verifies the generated encoding (104) using the verification information (105) and the public information (107). This verification provides assurance that the generated encoding (104) corresponds to the encoding of the content of the message (101) provided by the user (100).

In the following subsections the changes of this approach are analyzed.

2.1 Preliminary Configuration Step

In the preliminary step, the configuration module computer device (109) generates a validation list (108) and the public information (107). The validation list (108) will be provided to the user (100), while the public information (107) will be provided to the encoding module computer device (103) and the reception module computer device (106).

The same methods for providing the validation list (108) to the user (100) as those described in FIG. 1 are considered in the method described in FIG. 2.

In the same way, the same methods for distributing the public information (107) to the encoding and reception module computer devices (103, 106) are considered. The verification information generator module computer device (111), which appears for the first time in this FIG. 2, also receives the public information (107) by the same means as specified for the encoding and reception module computer devices (103, 106) in FIG. 1.

According to the two possible approaches for generating the verification information (105) we can see minor changes.

2.1.1 Zero Knowledge Proofs

In a first preferred embodiment, the codes in the validation list (108) and the public information (107) have a cryptographic relationship, and the messages in the validation list (108) and the public information (107) have a public relationship. In this embodiment, the validation list (108) and associated public information (107) are of the same kind as those described in the main invention (FIG. 1).

To summarize, the validation list (108) contains pairs of private key and message, for all the messages in the set of messages to be encoded. The public information (107) contains pairs of public key and message, for all the messages in the set of messages to be encoded, wherein each public key associated to one message in the public information (107) corresponds to the private key associated to the same message in the validation list (108), according to an asymmetric encryption scheme. The public parameters of the asymmetric encryption scheme, for example the RSA/ElGamal/Paillier modulo, or the elliptic curve parameters for EC-ElGamal, are also included in the public information (107).

2.1.2 Return Codes

In a second preferred embodiment, the messages and codes in the validation list (108) and the public information (107) have a cryptographic relationship. This cryptographic relationship consists on the following: the public information (107) contains pairs of reference-value, at least one per each message in the validation list (108), where 'value' is an encryption of a digitally signed piece of information. The decryption key to recover such digitally signed piece of information is constructed with a cryptographic operation involving the message 'm_i' and the code corresponding to such message in the validation list (108). This cryptographic operation uses secret keys and cryptographic algorithms such as one-way keyed functions and symmetric encryption algorithms.

The use of the verification information generator module computer device (111) does not require changes on how the validation list (108) is generated (FIG. 1). However, open the door to a new way of generating this validation list (108) considering two secret keys that will be distributed to two different components: encoding module computer device (103) and verification information generator module computer device (111).

An example is the following:

For each message 'm_i' in the validation list (108):

1. A code C_i is generated, at random or using a pseudo-random number generator.
2. A first transformation PTR_i is computed from the message using a keyed one-way function such as exponentiation in a finite field, using a private key 'ske1', which is the private part of a cryptographic key pair composed by this private key 'ske1' and a public key 'pke1'.
3. A second transformation LTR_i is computed from the first transformation PTR_i, using a keyed one-way function as an exponentiation in a finite field using a second secret key 'ske2', or symmetric cryptographic algorithms such as message authentication code generation (for example, HMAC), or symmetric encryption schemes (for example, AES), using the same second secret key 'ske2'. In order to maintain a cryptographic relationship between the codes and the messages, the code C_i is combined either to the message m_i to compute the first transformation PTR_i in step 2, or to the value PTR_i to compute to compute the second transformation LTR_i in step 3. This combination can be a concatenation, a xor between the two values, or any other operation so that a value result of such combination can be used as input to the keyed one-way functions used to compute either PTR_i, or LTR_i.
4. A value T_i is generated, using a random or pseudo-random number generator. This value is digitally signed using a private key 'sks', which is the private part of a cryptographic key pair composed by this private key 'sks' and a public key 'pks', and a cryptographic signing algorithm, such as RSA.
5. The value T_i and its signature are encrypted using a symmetric encryption algorithm, such as AES, and result of the second transformation, LTR_i, is used as the secret key for performing the symmetric encryption. The result is denoted as E((T_i, sig(T_i)), LTR_i).

The information generated above is structured as follows:

The validation list (108) contains the list of messages 'm_i', each one associated to its corresponding code 'C_i'.

(m_1, C_1)

(m_2, C_2)

...

(m_n, C_n)

The public information (107) contains a mapping table/file where at least one pair reference-value is stored for each message 'm_i' appearing in the validation list (108). The reference is a one-way function such as a cryptographic hash function H (for example, of the family of SHA-1, SHA-2, SHA-3) computed over the result of the second transformation, LTR_i, and the value is E(T_i, sig(T_i)), which is the result of the encryption of T_i and its signature, using the result of the second transformation, LTR_i, as key.

(H(LTR_1), E((T_1, sig(T_1)), LTR_1))

(H(LTR_2), E((T_2, sig(T_2)), LTR_2))

...

(H(LTR_n), E((T_n, sig(T_n)), LTR_n))

The public information (107) also contains the public keys 'pke1', 'pks', which are the public parts of the cryptographic key pairs '(pke1, ske1)', '(pks, sks)', for which 'ske1' has been used to compute the first transformation PTR_i for each message m_i, and 'sks' has been used to sign each of the values T_i.

In a preferred embodiment, at least the key pair (pke1, ske1), is different for each user intended to use the mechanism. In another preferred embodiment, the set of codes 'C_i' is different for each user intended to use the mechanism. Therefore, in both cases a different validation list (108) and public information (107) will be generated for each of the users which are intended to use the method described in this invention.

In an alternative embodiment, '(pke1, ske1)', 'ske2', '(pks, sks)', the set of codes 'C_i' and therefore the validation list (108) and the public information (107) are the same for all users.

In the preferred embodiment part of the cryptographic private/secret keys used to establish such relationship is provided to the encoding module computer device (103) and another part of such keys is provided to the verification information generator module computer device (111). For the example of generation of such validation list (108) and public information (107) explained above, the private key 'ske1' would be provided to the encoding module computer device (103) and the private key 'ske2' would be provided to the verification information generator module computer device (111). Distribution methods such as the ones described for the distribution of the public information (107) can be used for distributing such cryptographic keys.

2.2 Provisioning Step a)

In step a) the user (100) provides the message (101) and ore or more codes related to such message (102). In the preferred embodiment described in the FIG. 2, the user (100) provides the message (101) to the encoding module computer device (103) and the one or more codes (102) to the verification information generator module computer device (111). In an alternative embodiment, the user (100) provides both the message (101) and the one or more codes (102) to the encoding module computer device (103), and the encoding module computer device (103) passes the one or more codes (102) to the verification information generator module computer device (111). In another alternative embodiment, the user (100) provides both the message (101) and the one or more codes (102) to the encoding module computer device (103), and the encoding module computer device (103) does not pass the received one or more codes (102) to the verification information generator module computer device (111).

The same interfaces used by the user (100) to provide said information to the encoding module computer device (103) described for the FIG. 1 are considered for the embodiment described in this figure, for the user (100) providing the message (101) to the encoding module computer device (103) and the one or more codes (102) either to the encoding module computer device (103) or to the verification information generator module computer device (111).

In a preferred embodiment described by FIG. 2, the user (100) provides the (one or more) code(s) (102) to either the encoding module computer device (103) or to the verification information generator module computer device (111) in this step a). In an alternative embodiment, the user (100) provides the (one or more) code(s) (102) to either the encoding module computer device (103) or to the verification information generator module computer device (111) after step b).

2.3 Encoding Step b)

In step b) the encoding module computer device (103) generates the generated encoding (104) of the content of the provided message (101). In a preferred embodiment the generated encoding (104) consists on the encryption of the whole or at least part of the message (101) using an asymmetric encryption algorithm such as RSA, ElGamal, Paillier or EC-ElGamal. The encryption is then performed with a public key corresponding to such algorithm.

In a preferred embodiment such public key and the corresponding encryption parameters are provided to the encoding module computer device (103) as part of the public information (107).

In an alternative embodiment this public key and the corresponding encryption parameters are not part of the public information (107) generated by the configuration module computer device (109) but generated by another entity, for example the intended receiver of the generated encoding (104). In such case, such public key and encryption parameters may be provided to the encoding module computer device (103) by any of the means described for the provision of the public information (107).

The encoding module computer device (103) uses encoding information (112) in order to generate the generated encoding (104). The generation of the encoding information (112) can be done as described in the main proposal (FIG. 1).

In a preferred embodiment where such generated encoding (104) is the encryption of the whole or at least part of the message (101), the encoding information (112) is the randomness, or at least part of it, used to perform the encryption according to the asymmetric encryption algorithm used. Thus, this encoding information (112) comprises random or pseudo-random data.

In a preferred embodiment such encoding information (112) is generated by the encoding module computer device (103), using some information from its internal state, and/or from events received through its input interfaces.

In an alternative embodiment, such encoding information (112) is generated by a device remote to the encoding module computer device (103), such as specific-purpose hardware.

With the addition of the verification information generator module computer device (111), the encoding module computer device (103) passes the generated encoding (104) and auxiliary information (113) to the verification information generator module computer device (111). In an alternative embodiment where the encoding module computer device (103) also has received the one or more codes (102) from the user (100), such module passes also such one or more codes (102) to the verification information generator module computer device (111). In another alternative embodiment where the encoding module computer device (103) has received the one or more codes (102) from the user (100) and uses them in its computations, the encoding module computer device (103) does not pass the one or more codes (102) to the verification information generator module computer device (111).

The generation of this auxiliary information (113) can depend on the way the verification information is generated.

2.3.1 Zero Knowledge Proofs

In a first preferred embodiment where the codes in the validation list (108) and the public information (107) have a cryptographic relationship, and the messages in the validation list (108) and the public information (107) have a public relationship, the auxiliary information (113) passed from the encoding module computer device (103) to the verification information generator module computer device (111) contains the encoding information (112). In a preferred embodiment where the encoding of the message (101) consists on the encryption of at least part of the content of such message (101), such encoding information (112) is the randomness used for such encryption.

2.3.2 Return Codes

In a second preferred embodiment where the messages and codes in the validation list (108) and the public information (107) have a cryptographic relationship, the auxiliary information (113) passed from the encoding module computer device (103) to the verification information generator module computer device (111) contains the encryption of the result of the cryptographic operation performed over the provided message (101), along with proofs of the correct computation of such encryption and cryptographic operations.

In a preferred embodiment, it is considered an alternative generation of the validation list (108) when using a verification information generator module computer device (111) for generating the verification information (105). In this case the encoding module computer device (103), apart from generating the generated encoding (104), also generates a cryptographic operation over the provided message (101). This cryptographic operation uses one or more private/secret cryptographic keys and cryptographic algorithms such as one-way keyed functions and symmetric encryption algorithms.

In a preferred embodiment where the user (100) provides the one or more codes (102) to the encoding module computer device (103), and such encoding module computer device (103) does not pass such one or more codes (102) to the verification information generator module computer device (111), such cryptographic operation is computed over a combination of both the provided message (101) and the provided one or more codes (102).

In an alternative embodiment where the user (100) provides the one or more codes (102) to the encoding module computer device (103), and such encoding module computer device (103) passes such one or more codes (102) to the verification information generator module computer device (111), such cryptographic operation is computed over a combination of both the provided message (101) and the provided one or more codes (102), or only over the provided message (101).

The combination of the provided message (101) with the one or more codes (102) can be a concatenation, a xor between the two values, a product, or any other operation so that the result of such combination can be used as input to the cryptographic operation to be performed.

An example of this cryptographic operation, following the description provided in the preliminary step of this section, is the following: the encoding module computer device (103) computes a first transformation PTR_i from the provided message 'm_i' (or the combination of message and code(s)) by computing a keyed one-way function such an exponentiation in a finite field, using a private key 'ske1', which is the private part of a cryptographic key pair composed by this private key 'ske1' and a public key 'pke1' which is contained in the public information (107). Note that the computation of PTR_i has to be the same than the one done in by the configuration module computer device (109) in the preliminary step.

The encoding module computer device (103) encrypts the result of this cryptographic operation using an asymmetric encryption algorithm and a public key, whose corresponding private key is owned by the receiver of such result, which in the embodiments described for this figure is the verification information generator module computer device (111).

In a preferred embodiment, the asymmetric encryption algorithm can have homomorphic properties such that, the result of first making a cryptographic operation over the message (101) and then encrypting the result of such cryptographic operation is the same than first encrypting the message (101) and then computing the cryptographic operation over the result of such encryption:

$E(f(m))=f(E(m))$, where $f( )$ denotes the cryptographic operation, and $E( )$ denotes the encryption.

Therefore, in a preferred embodiment the encoding module computer device (103) encrypts the combination of message (101) and code (102), and then performs the cryptographic operation over the result, and in an alternative embodiment the encoding module computer device (103) first performs the cryptographic operation over the combination of message (101) and code (102), and then the encryption of the result.

In such preferred or alternative embodiments, the encoding module computer device (103) also generates one or several proofs of the correct computation of the cryptographic operation, and of the correct encryption of the result of such correct computation. In a preferred embodiment, such proof is a zero-knowledge proof of knowledge, well known in the state of the art of cryptography.

2.4 Proving Step

In this proving step, the verification information generator module computer device (111) may use the generated encoding (104), the auxiliary information (113), the one or more codes (102) received from either the user (100) or the encoding module computer device (103) and the public information (107) to generate the verification information (105).

The processes implemented by the verification information generator module computer device (111) depend on the type of proof used for creating the verification information (105).

2.4.1 Generation of the Verification Information (105) with OR-ZKP

In a first preferred embodiment, where the generated encoding (104) is the encryption of the message (101) provided by the user (100); the codes in the validation list (108) are private keys linked to messages; their corresponding public keys, also linked to messages, are part of the public information (107); and the auxiliary information (113) is the encoding information (112), which in a preferred embodiment is the randomness used for the encryption:

1. The codes (102) provided by the user (100) are the set of codes in the validation list (108) associated to all the messages but to the one provided (101).
2. The verification information is a zero-knowledge proof of knowledge well known in the state of the art of cryptography for the relation R2cnf_OR. The generation of such zero-knowledge proof for such relation has been defined for the embodiments in FIG. 1, in the same step.

2.4.2 Generation of the Verification Information (105) with AND-ZKP

In a second preferred embodiment, where the generated encoding (104) is the encryption of the message (101) provided by the user (100); the codes in the validation list (108) are private keys linked to messages; their corresponding public keys, also linked to messages, are part of the public information (107); and the auxiliary information (113) is the encoding information (112), which in a preferred embodiment is the randomness used for the encryption:

1. The code (102) provided by the user (100) is the code in the validation list (108) associated to the provided message (101).
2. The verification information is a zero-knowledge proof of knowledge well known in the state of the art of cryptography for the relation R2cnf_AND. The generation of such zero-knowledge proof for such relation has been defined for the embodiments in FIG. 1, in the same step.

2.4.3 Generation of the Verification Information (105) with Return Codes

In a third preferred embodiment, where the generated encoding (104) is the encryption of the message (101) provided by the user (100); the encoding information (112) is the randomness used for the encryption; the messages and codes in the validation list (108) and the public information (107) have a cryptographic relationship; and the auxiliary information (113) passed from the encoding module computer device (103) to the verification information generator module computer device (111) contains the result of a cryptographic operation performed over the provided message (101), or over the provided message (101) and the one or more provided codes (102):

The verification information is a signed value T_i, digitally signed with a private key 'sks', the public key 'pks' of which is contained in the public information (107).

In this third preferred embodiment, the verification information (105) is computed in the following way using as input the result of the cryptographic operation provided in the auxiliary information (113), which in a preferred embodiment is the first transformation PTR_i, and the public information (107):

1. Compute the transformation LTR_i using as input the result of the cryptographic operation provided in the auxiliary information (113), which in a preferred embodiment is the first transformation PTR_i; and the secret key 'ske' in the same way that has been described in the preliminary step of this section.
2. Compute a one-way function such as a cryptographic hash function H (for example, of the family of SHA-1, SHA-2, SHA-3) over the result of the transformation, LTR_i, in the same way that has been described in the preliminary step of this section for the generation of the public information (107).
3. Use the result of the computation from step 2 as reference to retrieve the corresponding value E((T_i, sig(T_i)), LTR_i) from the public information (107).
4. Decrypt the signed value T_i, and its signature sig(T_i), using a symmetric encryption algorithm, such as AES, and the result of the transformation (LTR_i) as the secret key for such decryption (in the same way that has been described in the preliminary step of this section). The result of this decryption is the verification information (105).

In an alternative embodiment where the one or more provided codes (102) are also received by the verification information generator module computer device (111), from either the user (100) or from the encoding module computer device (103):

Such code or codes (102) are the codes in the validation list (108) associated to the provided message (101).

The computation of the transformation LTR_i described in the previous step 1 uses as input a combination of the transformation PTR_i and the provided code or codes (102). This combination can be a concatenation, a xor between the two values, or any other operation so that a value result of such combination can be used as input to the keyed one-way function used to compute LTR_i. This combination has to match the one used in for the generation of the public information (107) described in the preliminary step of this section.

In a preferred embodiment where the auxiliary information (113) contains the result of cryptographic computations and zero-knowledge proofs of knowledge which prove the correctness of such cryptographic computations, such zero-knowledge proofs are verified prior to processing the result of the cryptographic computations.

In another preferred embodiment where the auxiliary information (113) contains the result of cryptographic computations in an encrypted form, such result of the cryptographic computations is decrypted using an asymmetric encryption algorithm (such as RSA, ElGamal, EC-ElGamal, etc.) prior to computing the verification information (105) from such cryptographic computations.

2.5 Validation Step d)

The embodiments for the verification of the correctness of the generated encoding (104) for this FIG. 2 are the same described for the FIG. 1 in step d).

3. Adding an Auxiliary Information Generator Module Computer Device (114)

In an alternative embodiment depicted by FIG. 3, the auxiliary information (113) generated in step b) by the encoding module computer device (103) in the embodiments described for the FIG. 2, is generated by an auxiliary information generator module computer device (114), external to such encoding module computer device (103).

In this embodiment, the encoding module computer device (103) passes the generated encoding (104) to such auxiliary information generator module computer device (114), which generates the auxiliary information (113), consisting on the result of a cryptographic operation performed over the generated encoding (104), encrypted using an asymmetric encryption algorithm.

In an alternative embodiment the user (100) also provides the one or more codes (102) to the encoding module computer device (103), and such encoding module computer device (103) passes such one or more codes (102) to the auxiliary information generation module computer device (114), which generates the auxiliary information (113) by computing a cryptographic operation over a combination of the generated encoding (104) and the one or more codes (102). The combination of the generated encoding (104) with the one or more codes (102) can be a concatenation, a xor between the two values, a product, or any other operation so that the result of such combination can be used as input to the cryptographic operation to be performed.

In a preferred embodiment this cryptographic operation uses one or more private/secret cryptographic keys and cryptographic algorithms such as one-way keyed functions, and asymmetric and symmetric encryption algorithms.

An example of this cryptographic operation is the following: the auxiliary information generator computer device (114) computes a transformation from the provided generated encoding (104), or from a combination of the provided generated encoding (104) and the provided one or more codes (102) by computing a keyed one-way function such as an exponentiation in a finite field, using a private key 'ske1', which is the private part of a cryptographic key pair composed by this private key 'ske1' and a public key 'pke1' which is contained in the public information (107). Note that the computation of such operation has to be the same than the one done by the configuration module computer device (109) for the value PTR_i in the preliminary step described in FIG. 2.

In a preferred embodiment, this keyed one-way function has homomorphic properties, such that the encryption of performing the keyed one-way function over a message results in the same value than performing the keyed one-way function over the encryption of a message.

In a preferred embodiment, the auxiliary information generator computes a re-encryption over the result of performing such cryptographic operation over the generated encoding (104) or, in an alternative embodiment, over the generated encoding (104) and the one or more provided codes (102), in such a way that the output of this re-encryption is the result of the cryptographic operation, encrypted with a public key of an asymmetric encryption algorithm for which the receiver of this information (the auxiliary information (113)) has the corresponding private key. In this preferred embodiment, the receiver of this auxiliary information (113) is the verification information generator module computer device (111).

In such preferred embodiment, the auxiliary information generator module computer device (114) also generates one or several proofs of the correct computation of the cryptographic operation, and of the correct re-encryption of the result of such correct computation. In a preferred embodiment, such proof is a zero-knowledge proof of knowledge, well known in the state of the art of cryptography. The proofs of correct computation are also part of the auxiliary information (113) which is passed to the verification information generator computer device (114).

Apart from the generation of the auxiliary information in step b) described here, the same embodiments described for the operations in steps a), b), c), d) and in the preliminary step in the FIG. 2 apply also in this FIG. 3, except from the fact that in the step d) the reception module computer device (106) either receives the generated encoding (104) from the encoding module computer device (103) or from the verification information generator module computer device (111).

4. Adding a Code Discloser Module Computer Device (115)

In an alternative embodiment (FIG. 5) the user (100) uses a code discloser module computer device (115) to generate the code or codes (102) to be provided to the encoding module computer device (103). The code discloser module computer device (105) can be a hand held device owned by the user (100), such a smartphone. In this embodiment, the user enters the message (101) into the code discloser module computer device (115), for example with a keyboard, and the code discloser module computer device (115) then reveals the one or more codes (102), for example by audio or on the screen.

In a preferred embodiment, the code discloser module computer device (115) receives the codes (102) to be disclosed from the configuration module computer device (109), in the preliminary step. These codes (102) are received from the configuration module computer device (109) in an encrypted form, using an asymmetric or symmetric encryption algorithm such as RSA or AES, and the code discloser module computer device (115) decrypts them with a cryptographic/secret key so that it can display the code (102) corresponding to an entered message (101) to the user (100).

In an alternative embodiment, the code discloser module computer device (115) generates the codes (102) internally, by performing a cryptographic operation, such as an encryption with deterministic properties (without randomness), over the message (101) provided by the user (100) and with a private/secret cryptographic key. In such alternative embodiment, the configuration module computer device (109) generates the codes (102) in the preliminary step in the same way described for the code discloser module computer device (115), and uses them to generate the cryptographically related public information (107), but does not pass such generated codes (102) to the user (100) (since the user (100) gets the codes (102) from the code discloser module computer device (115)).

The scope of the present invention is defined in the following set of claims.

The invention claimed is:

1. A method for the verification of the correct content of an encoded message, the method comprising:
   a) receiving, by an encoding module computer device (103), from a user (100), a message (101) including a content to be encoded;
   b) generating, by the encoding module computer device (103), a generated encoding (104) of the content of the received message (101) using encoding information (112);
   c) sending, by the encoding module computer device (103), said generated encoding (104) to a reception module computer device (106);
   d) verifying, by the reception module computer device (106), that the generated encoding (104) corresponds to the encoding of the content of the message (101), without decoding the generated encoding (104) and neither compromising the message (101) privacy, using a generated verification information (105) and public information (107); and
   e) executing a preliminary configuration step in which a configuration module computer device (109) generates, from a list of possible messages (101) and a list of users (100), said public information (107) and a validation list (108) of each user (100), and provides the validation list (108) to each user (100) and the public information (107) to the encoding module computer device (103) and to the reception module computer device (106),
wherein:
   the verification information (105) is generated either by the encoding module computer device (103), a verification information generator module computer device (111), or both together, by using the generated encoding (104), the encoding information (112), said public information (107) and at least one code (102) associated with the message (101) provided by the user (100), and by using a OR zero-knowledge proof of knowledge or a AND zero-knowledge proof of knowledge procedure,
   the at least one code (102) is selected by the user (100) from the validation list (108),
   the encoding information (112) comprises random or pseudo-random data,
   the validation list (108) contains the list of possible messages (101), each one correlated with one of more different codes (102),
   the public information (107) contains at least as many public lists (116) of information as validation lists (108), each public list (116) being related to a validation list (108) and containing at least one public code (117) per valid messages (101),
   the at least one code (102) is a private key and has a cryptographic relationship with the public information (107) and with the message (101), and
   the public information (107) and the message (101) have a cryptographic or a public relationship.

2. The method of claim 1, wherein the verification information (105) being generated by the verification information generator module computer device (111) to which the encoding module (103) is connected thereto, the verification information (105) being generated upon the verification information generator module computer device (111) having received, from the encoding module computer device (103), the generated encoding (104) and an auxiliary information (113) and, from the user (100), the at least one code (102).

3. The method of claim 1, wherein the verification information (105) being generated by the verification information generator module computer device (111) upon the latter having received, from an auxiliary information generator module computer device (114), the generated encoding (104) and an auxiliary information (113) and, from the user (100), the at least one code (102), said auxiliary information (113) being generated by said auxiliary information generator module computer device (114) by using at least one of the generated encoding (104) and the at least one code (102), and one or more cryptographic secret keys, wherein said generated encoding (104) and/or said at least one code (102) being received from the encoding module (103) and the one or more cryptographic secret keys being received from the configuration module (109).

4. The method of claim 1, wherein the at least one code (102) being received by the encoding module computer device (103) or by the verification information generator module computer device (111) at the same time of said reception of the message (101) in step a), or after the encoding module computer device (103) having generated the generated encoding (104) of the content of the received message (101).

5. The method of claim 4, comprising receiving the at least one code (102), by the encoding module computer device (103) or by the verification information generator module computer device (111), via an input interface at least including: a wired or a wireless connection, an USB connection, a Smartcard, a QR/barcode scanning, or a keyboard input.

6. The method of claim 1, wherein said encoding information (112) being generated by the encoding module computer device (103) or by a computer device remote to the encoding module computer device (103).

7. The method of claim 1, wherein said validation list (108) being provided to the user (100) at least by means of a paper support, a presentation on a display of a computing device, a hardware token with storage capabilities including RFID, and/or a hardware token with storage and logic capabilities including a SmartCard.

8. The method of claim 1, wherein the public information (107) being provided to the encoding module computer device (103) and to the reception module computer device (106):

as part of an initial configuration of the modules (103), (106); or from a central or distributed repository (110); or from an external source through a wired or wireless connection, a USB connection, a Smartcard, a QR/barcode scanning or a keyboard input.

9. The method of claim 1, wherein the at least one code (102) being generated by a code discloser module computer device (115) by performing a cryptographic operation, including an encryption with deterministic properties with a private/secret cryptographic key, over the message (101) received from the user (100), the message (101) being received by the code discloser module computer device (115) via an input interface and the cryptographic key being internally generated by the code discloser module computer device (115).

10. The method of claim 1, wherein the at least one code (102) being generated by a code discloser module computer device (115), upon the code discloser module computer device (115) having received the at least one code from the configuration module computer device (109) in an encrypted form and having decrypted the at least one code (102) with a cryptographic key, the cryptographic key being internally generated by the code discloser module computer device (115).

11. The method of claim 2, wherein:
the auxiliary information (113) contains the encoding information (112), or,
the auxiliary information (113) contains a cryptographic transformation of the message (101) using a cryptographic secret key, or,
the auxiliary information (113) is empty.

12. The method of claim 2, wherein the verification information generator module computer device (111) comprises using a secret key/secret information or a cryptographic key containing cryptographically related secret and public information for generating the verification information (105).

13. The method of claim 1, wherein the reception module computer device (106) performs several actions depending on the result of said verification that the generated encoding (104) corresponds to the encoding of the content of the message (101), comprising:

notifying the result of the validation to another user through an output interface including a screen or an audio signal; and/or sending back to the encoding module computer device (103) the result of the validation; and/or sending back the result of the validation directly to the user (100); and/or publishing the result of the validation with a reference of the generated encoding (104); and/or attaching the result of the verification to at least the generated encoding (104) and the verification information (105), storing the attached result and further retransmiting it to another module computer device.

14. The method of claim 1, comprising performing said verification that the generated encoding (104) corresponds to the encoding of the content of the message (101), automatically after the reception module computer device (106) having received the generated encoding (104) and the verification information (105), or periodically every certain period of time.

15. The method of claim 1, wherein the generated encoding (104) is the encryption of the whole or at least part of the message (101), and the encoding information (112) is the randomness, or at least part of it, used for said encryption.

16. The method of claim 1, wherein in said step b) the public information (107) is further used for generating the generated encoding (104) of the content of the received message (101).

17. The method of claim 3, wherein:
the auxiliary information (113) contains the encoding information (112), or,
the auxiliary information (113) contains a cryptographic transformation of the message (101) using a cryptographic secret key, or,
the auxiliary information (113) is empty, and
wherein the verification information generator module computer device (111) comprises using a secret key/secret information or a cryptographic key containing cryptographically related secret and public information for generating the verification information (105).

* * * * *